US008058775B2

(12) United States Patent
Tsuruta

(10) Patent No.: US 8,058,775 B2
(45) Date of Patent: Nov. 15, 2011

(54) MOVABLE TABLE UNIT WITH PIEZOELECTRIC ELEMENT AND STRAIN GAUGE

(75) Inventor: Naohito Tsuruta, Mino (JP)

(73) Assignee: Nippon Thompson Co., Ltd, Tokyo (JP)

(*) Notice: Subject to any disclaimer, the term of this patent is extended or adjusted under 35 U.S.C. 154(b) by 336 days.

(21) Appl. No.: 12/414,791

(22) Filed: Mar. 31, 2009

(65) Prior Publication Data

US 2009/0243432 A1    Oct. 1, 2009

(30) Foreign Application Priority Data

Mar. 31, 2008    (JP) .................. 2008-091812

(51) Int. Cl.
*H01L 41/04*    (2006.01)
(52) U.S. Cl. ...................................... 310/328
(58) Field of Classification Search ............ 310/328
See application file for complete search history.

(56) References Cited

U.S. PATENT DOCUMENTS

| 4,686,440 | A | * | 8/1987 | Hatamura et al. | ............ 318/646 |
| 4,814,660 | A | * | 3/1989 | Yamada et al. | ............. 310/328 |
| 4,888,878 | A | * | 12/1989 | Nagasawa et al. | ............. 33/573 |
| 5,051,594 | A | * | 9/1991 | Tsuda et al. | ............. 250/442.11 |
| 5,281,884 | A | * | 1/1994 | Basavanhally et al. | ....... 310/328 |
| 5,705,878 | A | * | 1/1998 | Lewis et al. | .................... 310/328 |
| 7,187,107 | B2 | * | 3/2007 | Chu et al. | ...................... 310/328 |
| 7,405,508 | B2 | * | 7/2008 | Petrenko | ....................... 310/317 |
| 2009/0323083 | A1 | * | 12/2009 | Park et al. | ..................... 356/614 |

FOREIGN PATENT DOCUMENTS

JP    2005236166    9/2005

* cited by examiner

*Primary Examiner* — Jaydi San Martin
(74) *Attorney, Agent, or Firm* — Cozen O'Connor

(57) ABSTRACT

A movable table unit provided here has a simple structure but can increase the precision of detecting the displacement of a movable table, and comprises a quadrangle frame-shaped stationary base a movable table disposed inside the stationary base, spring members interposed between the movable table and the stationary base, and a piezoelectric element fixed to either the stationary base or the movable table and capable of expanding/contracting in the axis direction to exert either an expansion or contraction force on the other, to allow the movable table to move relative to the stationary base. A strain gauge is mounted in a strain occurrence site where strain occurs as the movable table moves, so that the amount of travel of the movable table is detected on the basis of the value detected by the strain gauge.

2 Claims, 10 Drawing Sheets

MOVABLE TABLE UNIT WITH PIEZOELECTRIC ELEMENT AND STRAIN GAUGE

BACKGROUND OF THE INVENTION

1. Field of the Invention

This invention relates to a movable table unit which uses a piezoelectric element as a drive source to allow a movable table to move infinitesimally.

2. Description of the Related Art

Devices which move a table within an infinitesimal range through the use of the expanding/contracting motion of a piezoelectric element are conventionally known. Such devices comprise a movable table coupled to a stationary base through spring members, and cause a piezoelectric element to expand/contract for movement of the movable table relative to the stationary base. For example, in a device disclosed in Japanese Unexamined Patent Application Publication No. 2005-236166, a movable table can be moved by being mounted on a stationary base through spring members. The movable table is coupled to one end of a piezoelectric element and the stationary base is coupled to the other end of the piezoelectric element. Upon expansion/contraction of the piezoelectric element by the passage of an electric current through it, an expansion force or a contraction force resulting from the expansion or contraction acts on the movable table or the stationary base to move the movable table.

In such a device, a change in voltage applied to the piezoelectric element effects a change in the amount of expansion/contraction of the piezoelectric element, which in turn changes the amount of travel of the movable table. In consequence, the amount of travel of the movable table can be controlled by controlling the voltage applied to the piezoelectric element.

In actual fact, however, the relationship between the voltage applied to the piezoelectric element and the amount of expansion/contraction of the piezoelectric element exhibits hysteresis. Precise control of the amount of travel of the movable table cannot be easily achieved simply by controlling the voltage. To overcome this, a strain gauge is mounted on the piezoelectric element to detect the amount of strain of the piezoelectric element, and then the amount of travel of the movable table is calculated on the basis of the detection.

For obtaining, in this way, the amount of travel of the movable table from the detected value of the strain gauge mounted on the piezoelectric element, the relationship between the amount of strain of the piezoelectric element and the amount of travel of the movable table has previously been measured, and then based on the measured relationship the amount of displacement of the movable table is calculated.

For example, FIG. 9 shows a graph of the relationship between the amount of strain detected by the strain gauge mounted on the piezoelectric element and the amount of displacement of the movable table which is the amount of actual travel of the movable table.

The graph in FIG. 9 appears to be straight, but strictly speaking it is not straight, and is a graph showing varying displacements of the movable table between the directions in which the amount of strain of the piezoelectric element increases and decreases, that is, exhibiting the so-called hysteresis. From such a relationship as shown in FIG. 9, a straight line approximated to this graph is obtained by a least-squares method. FIG. 10 is a graph showing linear error in which the scales on the vertical axis represent the degree of error from the above-mentioned approximated straight line. It is seen from the linear error graph in FIG. 10 that there exists a linear error s1 which shows error from the approximated straight line and a back-and-forth difference s2 which is the difference between the amount of displacement of the movable table caused during the expansion of the piezoelectric element and the amount of displacement of the movable table caused during the contraction of the piezoelectric element.

In this regard, the conventional movable table unit has a strain gauge mounted on the piezoelectric element, and details of the structure of other components are omitted.

As described above, the relationship between the amount of strain of the piezoelectric element and the amount of displacement of the movable table exhibits hysteresis and is not a completely proportional relation. Such a relationship causes disadvantageous difficulties in precisely determining the amount of travel of the movable table.

In particular, some uses of the movable table unit using a piezoelectric element require a resolution of a few tens of nm. In such a case, the conventional movable table unit as described above is incapable of addressing the requirement.

To overcome this, combination with an optical detection means such as a linear scale or the like can be considered for detecting the amount of travel of the movable table and at the same time correcting the error. However, the provision of an optical detection means makes the apparatus complicated, with an increase in size and an increase in cost.

SUMMARY OF THE INVENTION

It is an object of the present invention to provide a movable table unit which is capable of increasing the precision of detection of the amount of displacement of a movable table with a simple structure and without an increase in manufacturing costs.

A movable table unit of the present invention comprises a ring-shaped stationary base, a movable table disposed inside the stationary base, spring members interposed between the movable table and the stationary base, and a piezoelectric element fixedly capable of expanding/contracting in the axis direction thereof. The piezoelectric element is attached to either the stationary base or the movable table and exerts an expansion/contraction force on the other one to which the piezoelectric element is not attached, to allow the movable table to move relative to the stationary base. The movable table unit comprises a strain gauge mounted in a strain occurrence site where strain occurs as the movable table moves, so that the amount of travel of the movable table is detected on the basis of a value detected by the strain gauge.

In the present invention, preferably, a beam may be mounted in the strain occurrence site, and may have one end secured to either the stationary base or the movable table and the other end to the movable table or the stationary base. The strain gauge may preferably be mounted on the beam.

In the present invention, preferably, the beam may be a beam of uniform strength.

In the present invention, at least four spring members may be respectively disposed on opposite sides of the axis of the piezoelectric element and to the front and to the back in the traveling direction of the movable table.

According to the present invention, the strain gauge is provided in a site where strain occurs in response to the movement of the table, thus making it possible to detect the amount of displacement of the movable table with high accuracy even with a simple structure without an optical system measurement means and the like. In consequence, high precision control for the position of the movable table can be achieved.

According to the present invention, the placement of the strain gauge on the beam makes it possible for the strain gauge to detect a larger amount of strain. For this reason, it is possible to reduce the ratio of the amount of displacement of the movable table to the amount of strain, thus improving the resolution with which the movable-table displacement is detected. In consequence, more precise positional control for the movable table is made possible.

In particular, in an aspect of the present invention, the strain gauge is mounted on the beam of uniform strength. Accordingly, when an external force acts on the leading end of the beam of uniform strength, the beam of uniform strength allows stress to occur uniformly over the entire beam. For this reason, the detection values obtained are the same even when the strain gauge is attached in a somewhat misaligned position. As a result, the affixing position of the strain gauge can be roughly determined, thus improving the operability of the unit assembly process.

According to the present invention, because the movable table is stably supported by at least four spring members and the piezoelectric element is disposed such that the force based on the expansion/contraction of the piezoelectric element acts on an area around the center of the movable table, a yawing motion does not easily occur when the movable table moves in the expansion-contraction direction of the piezoelectric element. In consequence, not only more precise displacement detection, but also more accurate alignment, can be achieved.

DETAILED DESCRIPTION OF THE PREFERRED EMBODIMENTS

Figure 1:
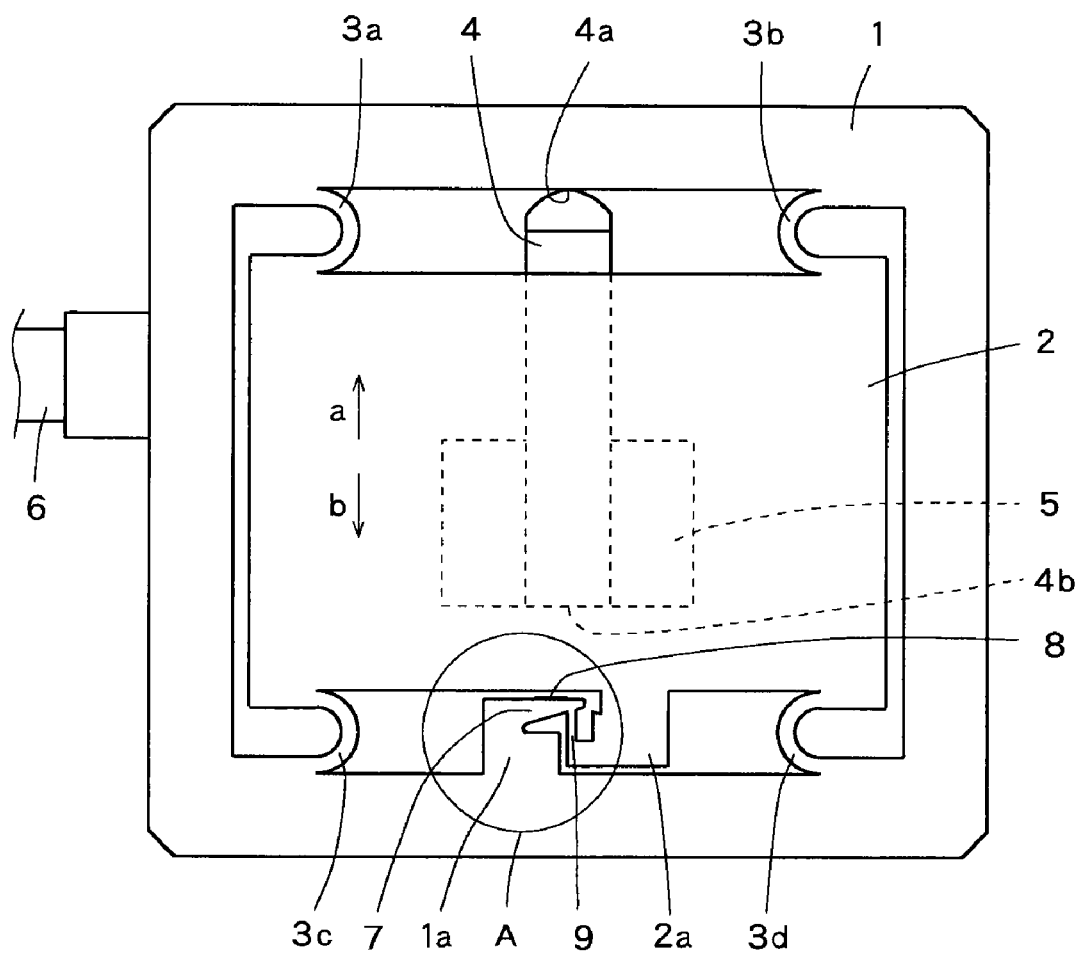
FIG. 1 is a plan view of an essential part of a first embodiment according to the present invention.
Figure 2:
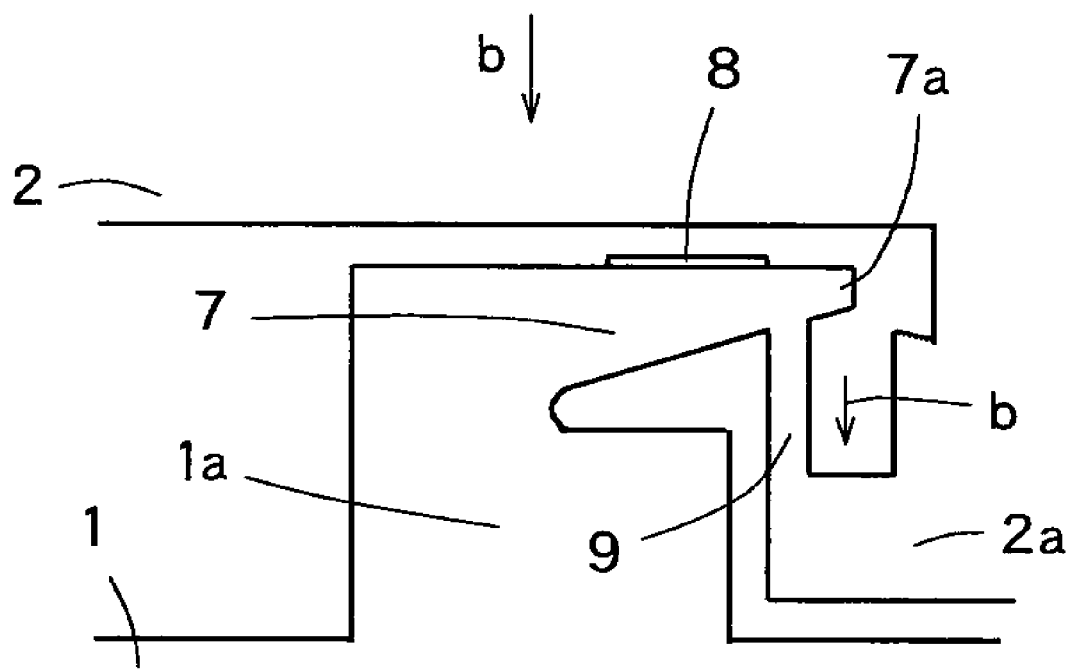
FIG. 2 is an enlarged view of a strain occurrence site indicated with the letter A in FIG. 1.
Figure 3:
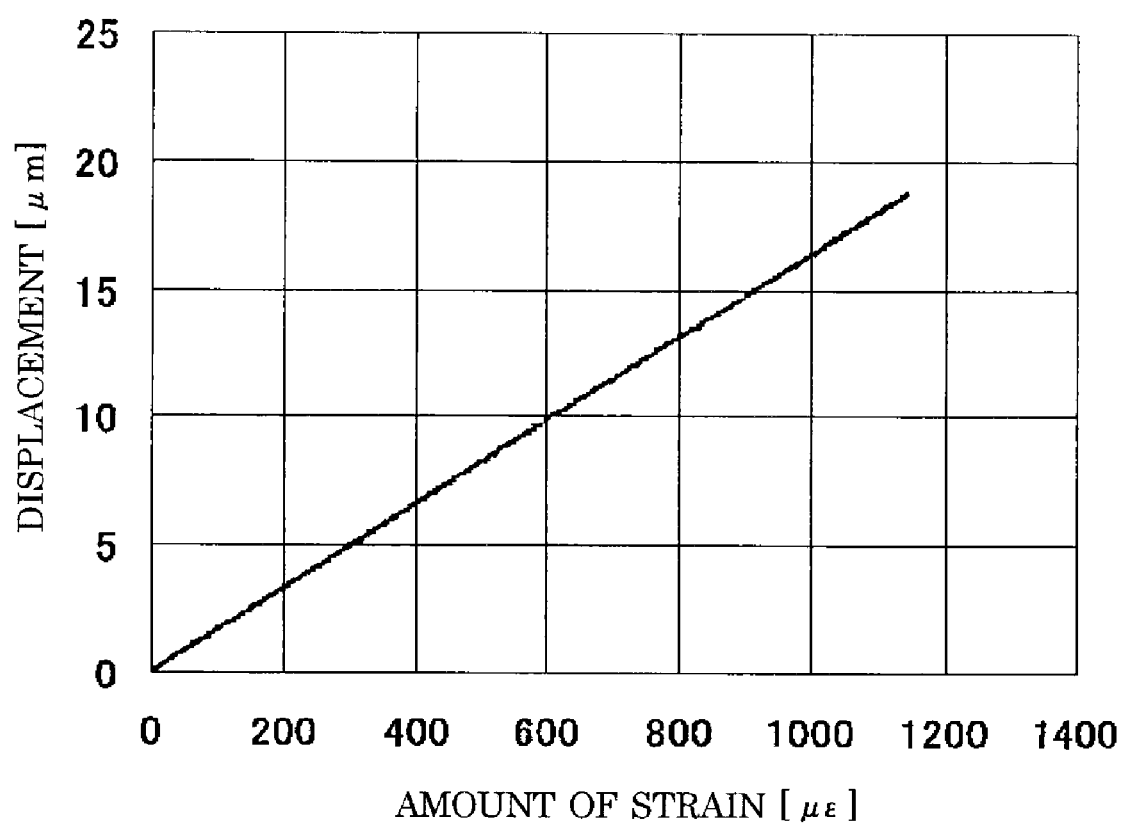
FIG. 3 is a graph showing the relationship between the amount of strain detected by a strain gauge and the amount of displacement of the movable table in the first embodiment.

A first embodiment illustrated in FIGS. 1 to 3 comprises a metallic movable table 2 provided in a quadrangular-frame-shaped metallic stationary base 1, and spring members 3a, 3b, 3c, 3d respectively comprising U-shaped plate springs and disposed in the four corners of the movable table 2. The movable table 2 is coupled to the stationary base 1 through the spring members 3a to 3d.

In the first embodiment, the stationary base 1, the movable table 2 and the spring members 3a to 3d are formed in one piece, but in this case the stationary base 1 and the movable table 2 posses overwhelmingly higher stiffness than that of the spring members 3a to 3d, and can be almost regarded as a rigid body.

A piezoelectric element 4 is disposed on a width-direction central portion of the rear side face of the movable table 2. The piezoelectric element 4 has a leading end 4a making contact with the inner side of the stationary base 1 and the opposing tail end 4b fixedly attached to the rear side face of the movable table 2 by use of a mounting member 5. The leading end 4a is a separate member bonded to the piezoelectric element 4. The piezoelectric element 4 is connected to the power source through a cord 6 by wiring (not shown) installed between them, so that the piezoelectric element 4 expands/contracts in accordance with the applied voltage such that the leading end 4a moves in the direction indicated by either the arrow a or the arrow b.

In actual fact, in the initial state the piezoelectric element 4 is operated to pressurize the stationary base 1 such that the spring members 3a to 3d are slightly flexed. The stationary base 1 is pressurized in the initial state in order to eliminate wobble in the movable table 2.

For example, in the initial state shown, when the piezoelectric element 4 expands under the application of voltage, the leading end of the piezoelectric element 4 causes a pressing force to act on the stationary base 1 in the direction indicated by the arrow a. Thereupon, a reaction to the pressing force occurs, which allows the movable table 2 to move in the direction indicated by the arrow b, deflecting the springs 3a to 3d.

On the other hand, when the piezoelectric element 4 after expanding as described above contracts, the leading end 4a moves in the direction indicated by the arrow b and the movable table 2 is moved in the direction of the arrow a by the elastic force of the spring members 3a to 3d to return to the initial state. In short, the movable table 2 moves in the direction of either the arrow a or the arrow b.

Stated another way, the movable table unit of the first embodiment comprises four opposing spring members 3a to 3d respectively disposed on opposite sides of the axis of the piezoelectric element 4 and to the front and to the back in the traveling direction of the movable table 2. The purpose of so placing the four spring members 3a to 3d which couple the movable table 2 to the stationary base 1 is to prevent the movable table 2 when moved by the expansion/contraction of the piezoelectric element 4 from easily yawing with respect to the axis of the piezoelectric element 4. The spring members 3a to 3d, which are disposed on opposite side of the axis of the piezoelectric element 4 and to the front and to the back in the traveling direction of the movable table 2, have the function of maintaining the linear movement of the movable table 2 moving in the axis direction of the piezoelectric element 4.

In the first embodiment, a beam 7 forming the strain occurrence site of the present invention is further provided on the side opposite to the leading end 4a of the piezoelectric element 4. A strain gauge 8 is attached along side in the length direction of the beam 7. The strain gauge 8 detects the amount of strain on the beam 7 and outputs a detection signal to a control unit (not shown) through a signal line (not shown).

FIG. 2 is an enlarged view of the part A in FIG. 1. As shown in FIG. 2, the beam 7 is formed in a coupling protrusion 1a extending from the stationary base 1 toward the movable table 2. The beam 7 decreases in width toward the leading end 7a, which forms a beam of uniform strength.

The movable table 2 also has a coupling protrusion 2a formed near the coupling protrusion 1a. A narrow coupling piece 9 has one end connected to the coupling protrusion 2a, and the other end coupled to a portion near the leading end 7a of the beam 7. Specifically, the beam 7 has one end, the leading end 7a in this case, fixedly attached to the movable table 2 through the coupling piece 9 and the coupling protrusion 2a, and the other end fixedly attached to the stationary base 1 through the coupling protrusion 1a.

In the movable table unit of the first embodiment structured as described above, when the movable table 2 is moved by the expansion/contraction of the piezoelectric element 4, the coupling protrusion 2a moves together with the movable table 2. Upon the movement of the coupling protrusion 2a, the coupling piece 9 connected to the coupling protrusion 2a moves, so that the force generated acts on the leading end 7a of the beam 7 to deflect the beam 7. For example, when the movable table 2 moves in the direction of the arrow b in FIG. 2, the coupling protrusion 2a also moves in the direction of the arrow b. As a result, the coupling piece 9 pulls the leading end 7a of the beam 7 in the direction of the arrow b to flex the beam 7.

When the beam 7 is thus flexed, the strain gauge 8 detects the amount of strain on the beam 7. In this regard, when the movable table 2 moves in the opposite direction to the arrow b, the force acting on the beam 7 in the b direction is weaker, thus effecting a change in the amount of strain on the beam 7.

In the movable table unit of the first embodiment, a measurement was made of the amount of strain detected by the strain gauge 8 and the amount of displacement which is the amount of actual movement of the movable table 2 when the movable table 2 moves upon the application of voltage to the piezoelectric element 4, and the relationship between them was studied through experiments. The results of the experiments are shown in graphs in FIGS. 3 and 4. FIG. 3 is a graph showing the amount of displacement (μm), that is, the amount of movement, of the movable table 2 relative to the amount of strain (με) of the piezoelectric element 4 detected by the strain gauge 8, in which the amount of displacement of the movable table 2 is, for example, an optically detected value and shows the amount of actual movement of the movable table 2.

Figure 4:
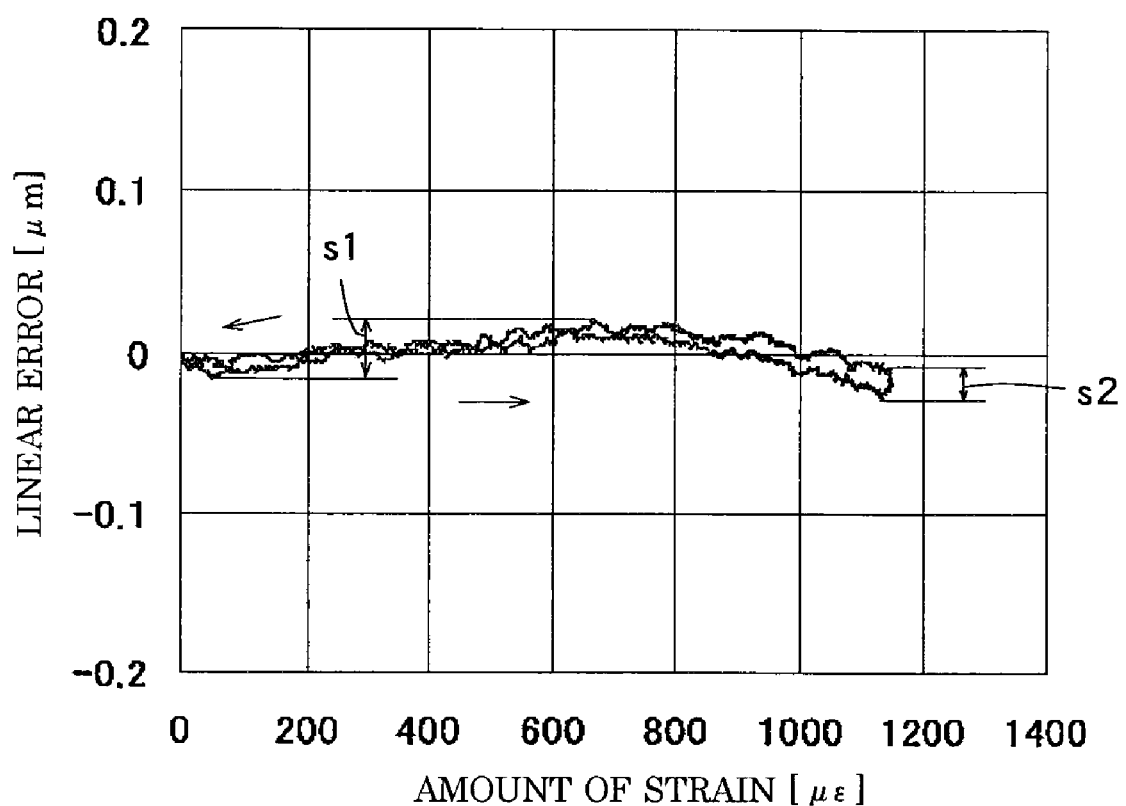
FIG. 4 is a graph showing the linear error in the graph shown in FIG. 3.

FIG. 4 is a linear-error graph clarifying the linear error s1 and the back-and-forth difference s2 in the graph shown in FIG. 3, in which the horizontal axis represents the amount of strain (με) detected by the strain gauge and the vertical axis represents the linear error (μm). The linear error s1 is represented as values showing how much the graph in FIG. 3 deviates from a straight line, which means the amount of error from an approximated straight line when the relationship between the amount of strain detected by the strain gauge 8 and the amount of displacement of the movable table 2 is approximated to the straight line as in the case of the graph shown in FIG. 10 describing the example of the related art. The back-and-forth difference s2 means the maximum value of the difference between the two displacements of the movable table 2 when, depending on the travel directions of the movable table 2, the movable table 2 assumes two different displacements in relation to the single amount of strain shown by the strain gauge 8.

Figure 9:
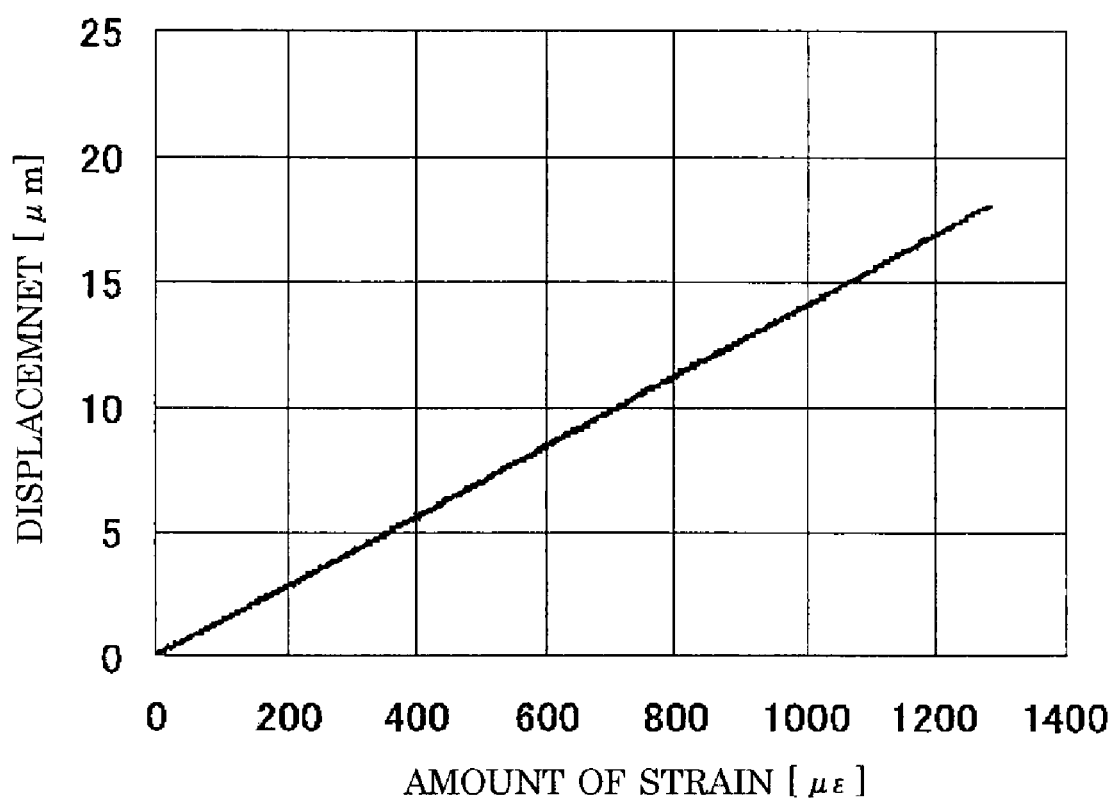
FIG. 9 is a graph showing the relationship between the amount of strain detected by a strain gauge and the amount of displacement of the movable table in an example of the related art.
Figure 10:
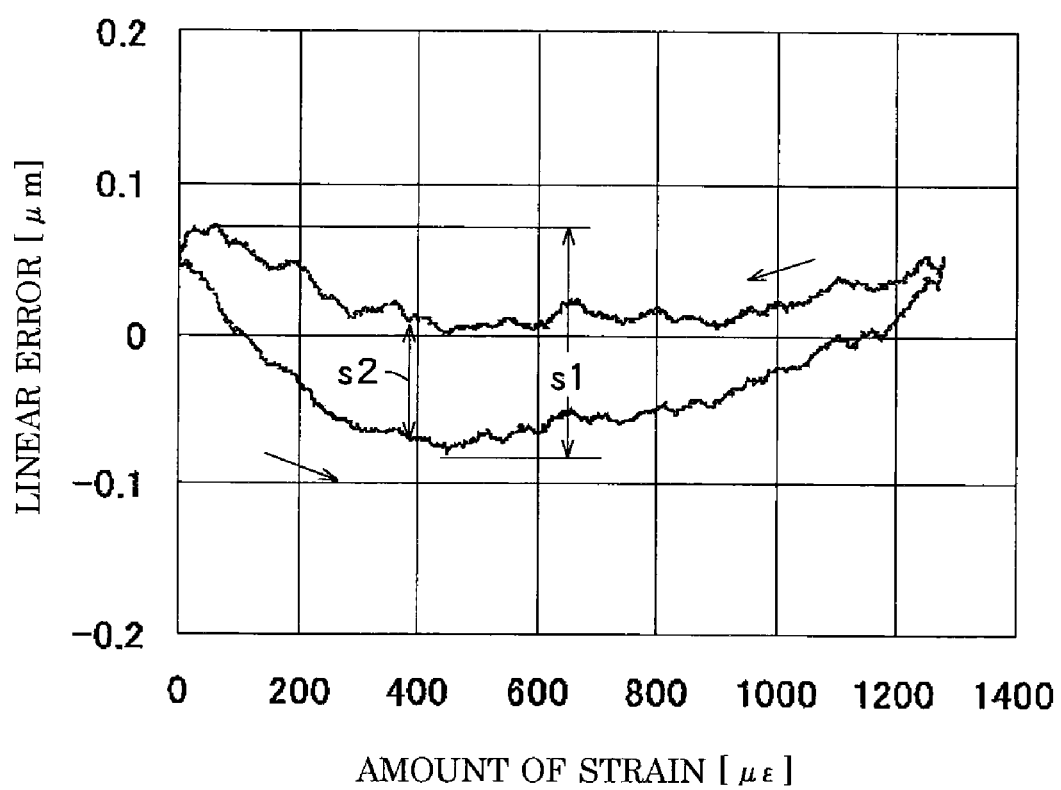
FIG. 10 is a graph showing the linear error in the graph shown in FIG. 9.

It can be seen from the graphs in FIGS. 3 and 4 that the movable table unit in the first embodiment exhibits a smaller linear error s1 and a smaller back-and-forth difference s2 than those in a conventional unit as shown in FIGS. 9 and 10. Specifically, the linear error s1 in the conventional unit was 0.150 μm, whereas the one in the movable table unit of the first embodiment was 0.047 μm. The back-and-forth difference s2 in the conventional unit was 0.080 μm, whereas the one in the movable table unit of the first embodiment was 0.015 μm.

Because the movable table unit of the first embodiment exhibits a very small linear error and a very small back-and-forth difference in the relationship between the amount of strain shown by the strain gauge 8 and the amount of displacement of the movable table 2 as described above, the amount of displacement of the movable table 2 can be calculated on the assumption that the amount of strain and the amount of displacement have a proportional relationship. That is, in the movable table unit of the first embodiment, because the linear error s1 is 0.047 μm, even if the relationship shown in FIG. 3 is approximated to a straight line, the position of the movable table 2 can be detected with a high degree of precision, assuming an error of ±25 nm.

Note that the conventional unit used in the above experiment has the same structure as that of the movable table unit of the first embodiment except that the strain gauge 8 employed in the movable table unit of the first embodiment shown in FIG. 1 is affixed to the piezoelectric element 4.

The first embodiment employs a beam of uniform strength 7 as a strain occurrence site to which the strain gauge 8 is attached. The following is the reason for the use of such a beam 7.

As described above, if the amount of displacement of the movable table 2 is not directly measured and is determined by the use of a value detected by a strain gauge 8 attached to a position other than the beam 7, the relationship between the amount of strain shown by the strain gauge 8 and the amount of displacement of the movable table 2 exhibits hysteresis or has a non-linear relationship, so that it can be expected that the elasticity and/or dimensional error of a member located in between and the mechanical properties of other members will affect the above relationship during the transmission of the drive force of the piezoelectric element 4 to the movable table 2.

For example, when an external force acts on the spring members, the movable table may possibly not move to exactly the same amount of displacement in response to the same external force in its expansion process and in its contraction process. In other words, the spring member also exhibits hysteresis.

If such a component member exhibiting hysteresis is interposed between the piezoelelctric element 4 and the movable table 2, the component member affects the relationship between the amount of strain caused by the piezoelectric element 4 and the amount of displacement of the movable table 2, causing it to exhibit hysteresis.

Repeated operations may possibly effect a change in the contact state between the leading end 4a of the piezoelectric element 4 and the contact portion of the stationary base 1. For example, if the leading end 4a is worn or the stationary base is depressed, an error will occur in detected values.

To avoid these, a strain occurrence site where the other component members have little effect and the amount of displacement of the movable table 2 is reflected more faithfully, is defined by disposing the strain gauge 8 between the stationary base 1 and the movable table 2. This makes it possible to reduce the hysteresis in the relationship between the amount of strain detected by the strain gauge 8 and the amount of displacement of the movable table 2.

The present invention employs a beam shape for the strain occurrence site as such a structure will allow strain to occur in response to even a slight displacement of the movable table 2.

The beam 7 of the first embodiment is a beam of uniform strength of a shape narrowing toward the leading end 7a. The beam of uniform strength has the property of uniformly producing stresses in the beam 7 in the length direction of the beam when an external force acts on the leading end 7a. Because of this property, even if the strain gauge 8 is affixed out of place on the beam 7, when the same external force acts, the same amount of strain can be detected. As a result, the use of the beam of uniform strength 7 offers the advantages of being able to mount the strain gauge 8 with less precision. The lessening of the precision for mounting the strain gauge 8 in turn improves the operability of the unit assembly process, leading to a cost reduction.

The beam used as the strain occurrence site of the present invention is not limited to being a beam of uniform strength. Instead of this, a beam of uniform thickness which is uniform in thickness throughout its length may be used as in a second embodiment illustrated in FIG. 5.

Figure 5:
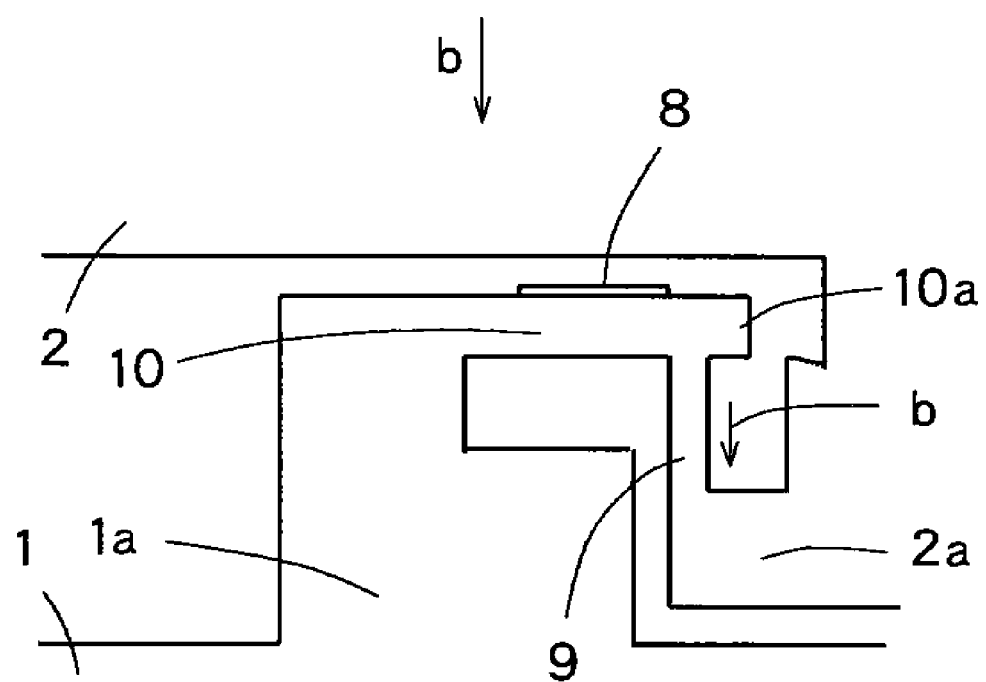
FIG. 5 is an enlarged view of a second embodiment.

The movable table unit of the second embodiment as illustrated in FIG. 5 comprises a beam of uniform thickness 10 which is used as the strain occurrence site of the present invention, instead of the beam 7 of the first embodiment, with the strain gauge 8 affixed to the beam 10. The other components in the second embodiment apart from the beam 10 are the same as those in the first embodiment. Therefore, the same component elements as those in the first embodiment are designated by the same reference numerals as those in the first embodiment. FIG. 1 as well as FIG. 5 is referred to in the following description.

Similar experiments to those in the first embodiment were made on the movable table unit of the second embodiment. The results of the experiments are shown in graphs of FIGS. 6 and 7.

Figure 6:
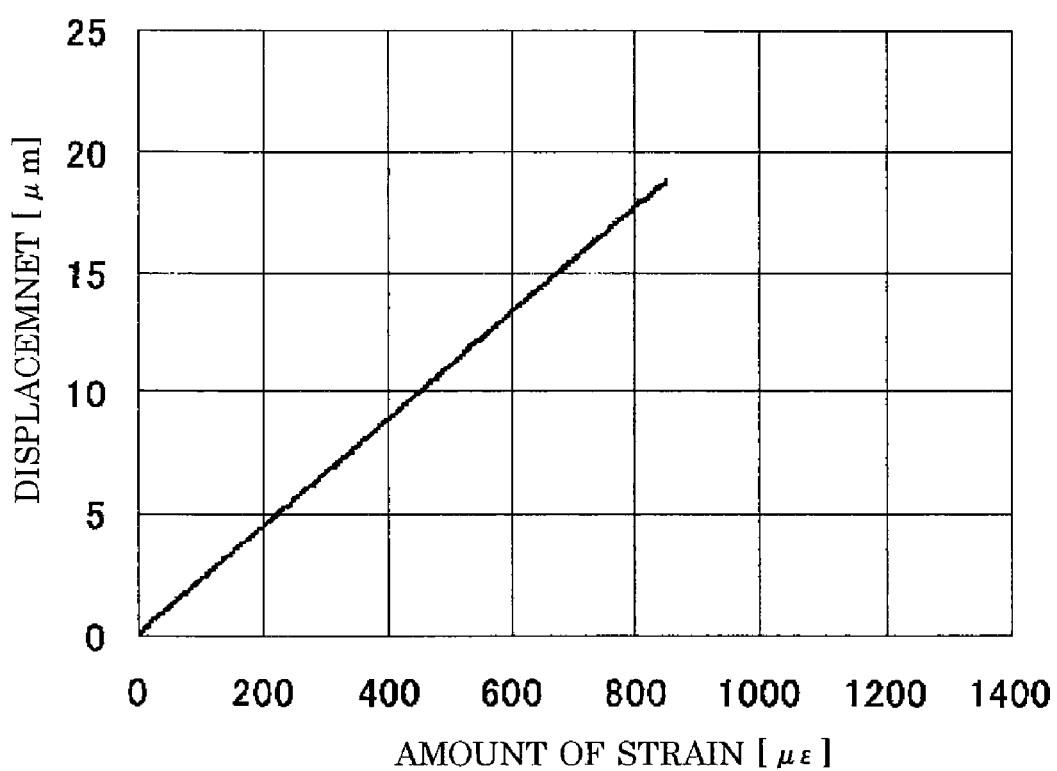
FIG. 6 is a graph showing the relationship between the amount of strain detected by a strain gauge and the amount of displacement of the movable table in the second embodiment.
Figure 7:
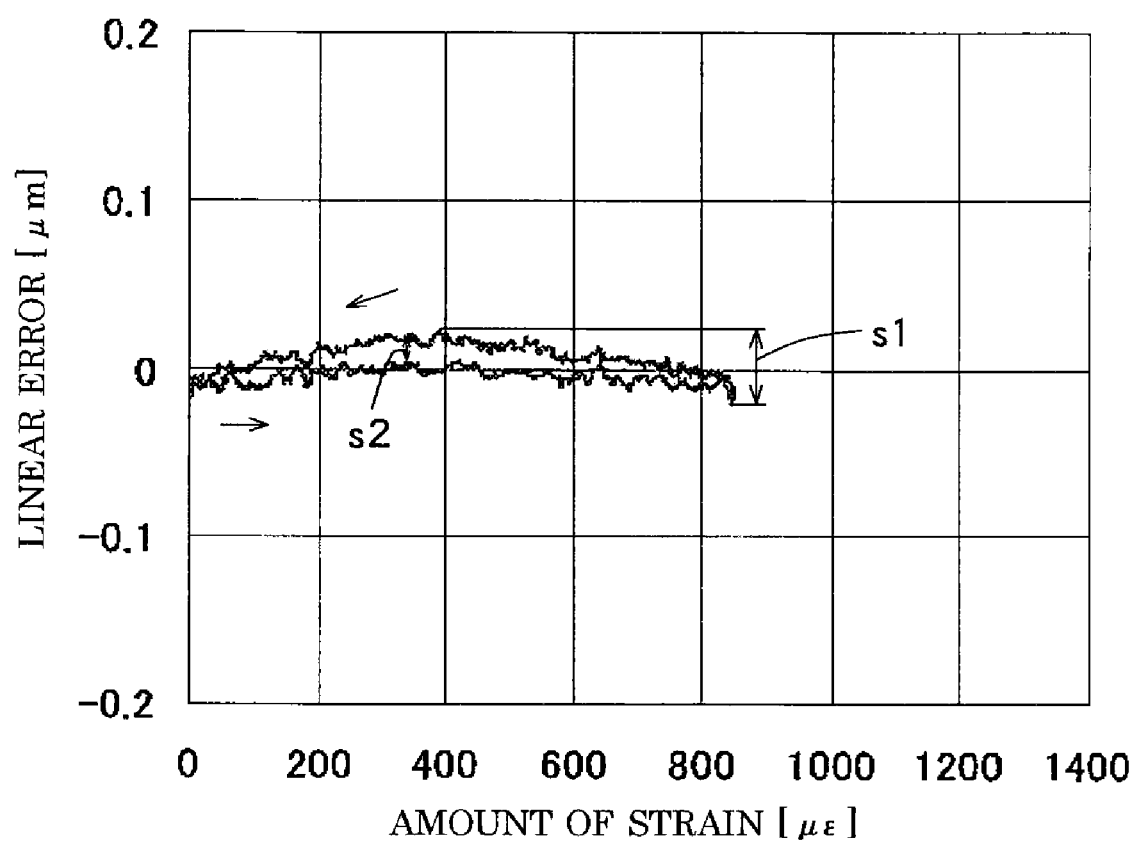
FIG. 7 is a graph showing the linear error in the graph shown in FIG. 6.

FIG. 6 is a graph showing the amount of displacement (μm), that is, the amount of movement, of the movable table 2 relative to the amount of strain (με) exerted by the piezoelectric element 4 detected by the strain gauge 8. FIG. 7 is a linear-error graph with the vertical axis representing the linear error. In the movable table unit of the second embodiment, the linear error s1 was 0.043 μm, and the back-and-forth difference s2 was 0.030 μm.

It is seen from the results of the foregoing experiments that, in the second embodiment, the linear error s1 and the back-and-forth difference s2 are smaller than those in the conventional unit, as in the case of the first embodiment, and the amount of travel of the movable table 2 can be detected with high accuracy.

However, the position for affixing the strain gauge cannot be determined as roughly as it can in the movable table unit of the first embodiment. This is because, in the beam of uniform thickness 10 in the second embodiment, the beam stress varies depending on its position in the longitudinal direction.

In the movable table unit of the first and second embodiments, if the stiffness of the beam 7 or 10 is reduced so that the beam is easily deflected, the gradient in the graph shown in FIG. 3 or 6 is reduced in angle, which makes it possible to increase the detection sensitivity for the amount of displacement of the movable table 2. However, if the strength of the beam is too much reduced, the stress may possibly exceed the yield point of the beam so as to break the beam when the amount of displacement of the movable table 2 is large. To avoid this, the strength of the beam is required to be determined in accordance with the movable range of the movable table 2. That is, there is a necessity to determine the movable range of the movable table 2 within a range in which the stress does not exceed the yield point.

In the beam of uniform strength 7 of the first embodiment, the stress is constant in the length direction, so that the beam 7 does not have any weak portion. Accordingly, if the beam of uniform strength is used, a beam that is weak throughout can be used. As a result, it is possible to increase the accuracy of detecting the amount of travel of the movable table 2.

On the other hand, when a typical beam of uniform thickness is used, stresses are irregularly produced. For this reason, there is a necessity to design the moveable table unit such that the stresses do not exceed the yield point in portions where stresses are concentrated.

Figure 8:
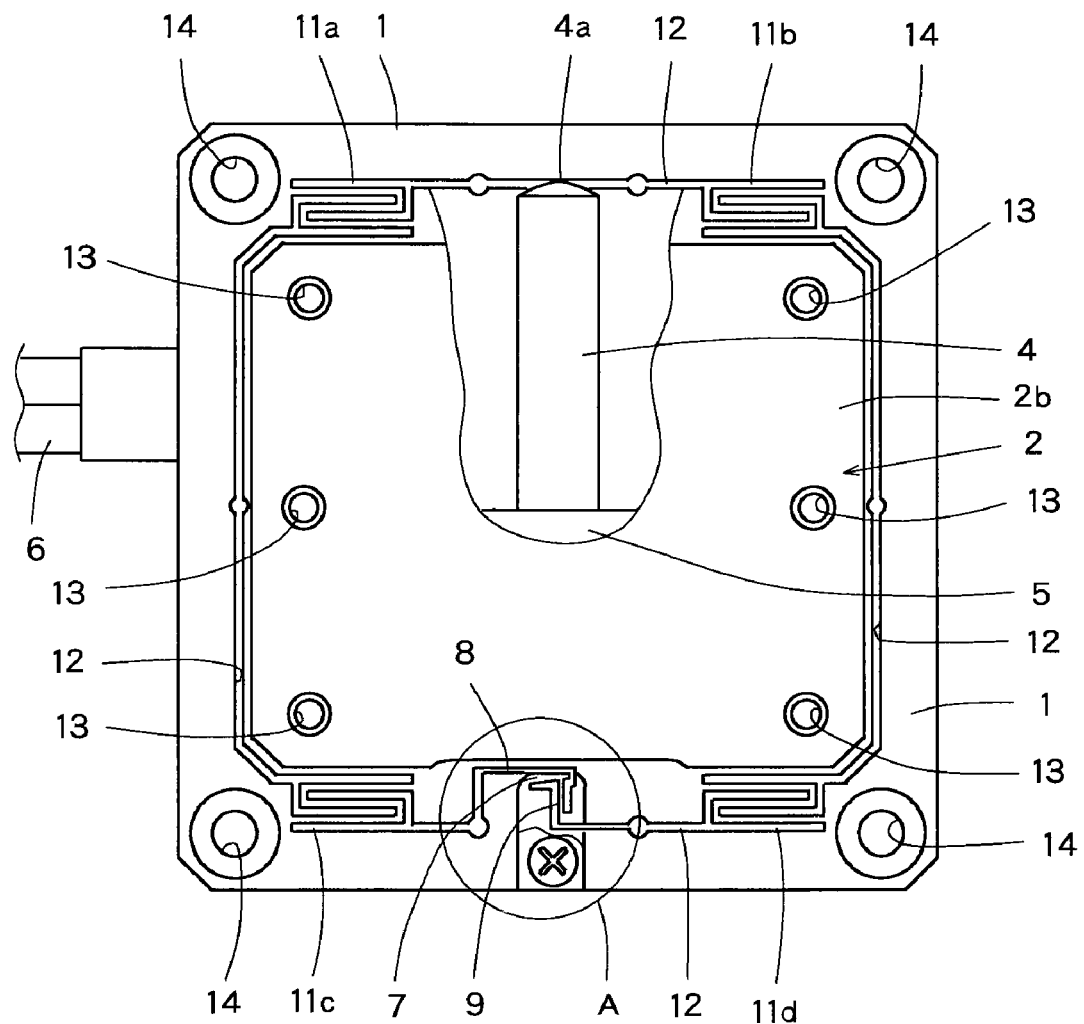
FIG. 8 is a partially cutaway plan view of an essential part of a third embodiment.

A third embodiment illustrated in FIG. 8 provide a movable table unit comprising parallel springs 11a to 11d instead of the spring members 3a to 3d including the U-shaped plate springs of the first embodiment.

Note that the portion A corresponding to the strain occurrence site of the present invention and the other components are the same as the in the first embodiment illustrated in FIG. 1. The same component elements as those in the first embodiment are indicated by the same reference numerals, and the details of the same component elements as those in the first embodiment are omitted. Points of difference from the first embodiment will be mainly described below.

In the third embodiment, a metal-made block is divided into a stationary base 1 and a movable table 2 which are defined by incisions 12. The incisions 12 are used to form the parallel springs 11a to 11d, the beam 7 and the like.

The movable table 2 of the third embodiment has a flat face 2b formed inside the outer periphery defined by the incisions 12 and extending toward the surface of the unit more than the other portions.

Reference numeral 13 in FIG. 8 denotes a fixing screw hole for mounting a work-piece on the movable table 2, and reference numeral 14 denotes a through-hole receiving a bolt for mounting the stationary base 1 on a pedestal or the like.

In the movable table unit of the third embodiment, the relationship between the amount of strain detected by the strain gauge 8 and the amount of displacement of the movable table 2 is realized as in the case of the first embodiment illustrated in FIGS. 3 and 4, because the beam of uniform strength 7 is affixed to the strain gauge 8. The third embodiment is identical with the first embodiment in that the amount of travel of the movable table 2 is capable of being precisely detected on the basis of the detection values of the strain gauge 8.

The movable table unit of the third embodiment has a shape allowing the stationary base 1, the movable table 2 and the parallel springs 11a to 11d to be formed through the wire cutting process for forming the incisions 12 in the metal-made block. In this way, because the movable table unit of the third embodiment comprises the component elements which can be formed through the wire cutting process, the manufacturing process is simple as compared with, for example, the process of assembling separate members or the process of attaching/mounting separate members.

In the first to third embodiments, the base end of the beam 7 or 10 is provided on the stationary base 1, but the beam may be provided in either the stationary base 1 or the movable table 2. The structure of coupling the beam to the movable table 2 or the stationary base 1 is not limited to the aforementioned embodiments.

The strain occurrence site of the present invention to which the strain gauge 8 is affixed is not limited to the beam.

In any case, the strain occurrence site may be located in a place where strain occurs by reason of the relative movement of the movable table 2 to the stationary base 1. For example, the strain gauge 8 may be mounted on the spring member.

What is claimed is:

1. A movable table unit, comprising:
a quadrangle frame-shaped stationary base;
a movable table disposed inside the stationary base;
spring members providing coupling between the movable table and the stationary base and the spring members movably supporting the movable table; movable table coupled to a stationary base through spring members, a piezoelectric element that is capable of expanding/contracting in its axis direction, the piezoelectric element fixedly attached to either the stationary base or the movable table and the piezoelectric element capable of exerting an expansion/contraction force on the other one to which the piezoelectric element is not attached, to allow the movable table to move relative to the stationary base, the piezoelectric element having a leading end;

wherein the piezoelectric element is provided at the center in the width direction perpendicular to a direction of movement of the movable table;

the spring members comprise four spring members respectively disposed on opposite sides of the axis of the piezolectric element and to the front and the back in the direction of the movement of the movable table; provided on the side opposite to the leading end 4a of the piezoelectric element a uniform strength beam is provided on the side opposite the leading end of the piezoelectric element, and has one end secured to either the stationary table or the movable table and the other end secured to the movable table or the stationary table; and a strain is gauge mounted in a strain occurrence site of the uniform strength beam where strain occurs as the movable table moves, so that the amount of travel of the movable table is detected on the basis of a value detected by the strain gauge.

2. The movable table unit according to claim 1, wherein the uniform strength beam is mounted in the strain occurrence site.

\* \* \* \* \*